(12) United States Patent
Jammes et al.

(10) Patent No.: US 7,028,204 B2
(45) Date of Patent: Apr. 11, 2006

(54) METHOD AND APPARATUS FOR ETHERNET PRIORITIZED DEVICE CLOCK SYNCHRONIZATION

(75) Inventors: Francois Jammes, Chamrousse (FR); Jacques Camerini, Grasse (FR); Julien Lagier, Grenoble (FR)

(73) Assignee: Schneider Automation Inc., North Andover, MA (US)

( * ) Notice: Subject to any disclaimer, the term of this patent is extended or adjusted under 35 U.S.C. 154(b) by 689 days.

(21) Appl. No.: 10/063,237

(22) Filed: Apr. 2, 2002

(65) Prior Publication Data

US 2002/0169844 A1   Nov. 14, 2002

Related U.S. Application Data

(63) Continuation-in-part of application No. 09/623,689, filed on Sep. 6, 2000.

(51) Int. Cl.
*G06F 13/14* (2006.01)

(52) U.S. Cl. ............... 713/400; 370/413; 370/439; 370/443; 370/444

(58) Field of Classification Search ............... 713/400; 370/413, 439, 443, 444
See application file for complete search history.

(56) References Cited

U.S. PATENT DOCUMENTS

| | | |
|---|---|---|
| 3,971,000 A | 7/1976 | Cromwell |
| 4,251,858 A | 2/1981 | Cambigue et al. |
| 4,319,338 A | 3/1982 | Grudowski et al. |
| 4,669,040 A | 5/1987 | Pettit et al. |
| 4,688,167 A | 8/1987 | Agarwal |
| 4,701,845 A | 10/1987 | Andreasen et al. |
| 4,845,644 A | 7/1989 | Anthias et al. |
| 4,858,152 A | 8/1989 | Estes |
| 4,897,777 A | 1/1990 | Janke et al. |
| 4,912,623 A | 3/1990 | Rantala et al. |
| 4,918,690 A | 4/1990 | Markkula, Jr. et al. |
| 4,937,777 A | 6/1990 | Flood et al. |
| 4,949,274 A | 8/1990 | Hollander et al. |
| 4,953,074 A | 8/1990 | Kametani et al. |
| 4,974,151 A | 11/1990 | Advani et al. |
| 4,979,107 A | 12/1990 | Advani et al. |
| 4,992,926 A | 2/1991 | Janke et al. |
| 5,012,402 A | 4/1991 | Akiyama |
| 5,023,770 A | 6/1991 | Siverling |
| 5,047,959 A | 9/1991 | Phillips et al. |
| 5,072,356 A | 12/1991 | Watt et al. |
| 5,072,412 A | 12/1991 | Henderson, Jr. et al. |
| 5,109,487 A | 4/1992 | Ohgomori et al. |
| 5,122,948 A | 6/1992 | Zapolin |

(Continued)

FOREIGN PATENT DOCUMENTS

DE    37 19283 A1    12/1988

(Continued)

OTHER PUBLICATIONS

WWWF94 '94 Information Form, Sep. 1, 1994, 3 pages.

(Continued)

*Primary Examiner*—A. Elamin

(57) ABSTRACT

A method and system for transferring a plurality of messages in an Ethernet industrial control environment. The messages are tagged with identifiers of varying levels of priority. The system has a serial network bus. Clock synchronization messages generated by a master device are tagged with a higher priority identifier, while other message types are tagged with a lesser priority identifier. Data having the highest priority identifier is placed onto the bus before placing data with a lesser priority identifier onto the bus.

29 Claims, 13 Drawing Sheets

U.S. PATENT DOCUMENTS

| | | | |
|---|---|---|---|
| 5,131,092 A | 7/1992 | Sackmann et al. | |
| 5,134,574 A | 7/1992 | Beaverstock et al. | |
| 5,151,896 A | 9/1992 | Bowman et al. | |
| 5,151,978 A | 9/1992 | Bronikowski | |
| 5,157,595 A | 10/1992 | Lovrenich | |
| 5,159,673 A | 10/1992 | Sackmann et al. | |
| 5,161,211 A | 11/1992 | Taguchi et al. | |
| 5,162,982 A | 11/1992 | Mentler | |
| 5,165,030 A | 11/1992 | Barker | |
| 5,179,700 A | 1/1993 | Aihara et al. | |
| 5,187,787 A | 2/1993 | Skeen et al. | |
| 5,225,974 A | 7/1993 | Mathews et al. | |
| 5,245,704 A | 9/1993 | Weber et al. | |
| 5,251,302 A | 10/1993 | Weigl et al. | |
| 5,283,861 A | 2/1994 | Dangler et al. | |
| 5,297,257 A | 3/1994 | Struger et al. | |
| 5,307,463 A | 4/1994 | Hyatt et al. | |
| 5,321,829 A | 6/1994 | Zifferer | |
| 5,343,469 A | 8/1994 | Ohshima | |
| 5,349,675 A | 9/1994 | Fitzgerald et al. | |
| 5,386,524 A | 1/1995 | Lary et al. | |
| 5,398,336 A | 3/1995 | Tantry et al. | |
| 5,406,473 A | 4/1995 | Yoshikura et al. | |
| 5,420,977 A | 5/1995 | Sztipanovits et al. | |
| 5,430,730 A | 7/1995 | Sepulveda-Garese et al. | |
| 5,440,699 A | 8/1995 | Farrand et al. | |
| 5,446,868 A | 8/1995 | Gardea et al. | |
| 5,471,617 A | 11/1995 | Farrand et al. | |
| 5,528,503 A | 6/1996 | Moore et al. | |
| 5,598,536 A | 1/1997 | Slaughter, III et al. | |
| 5,611,059 A | 3/1997 | Benton et al. | |
| 5,613,115 A | 3/1997 | Gihl et al. | |
| 5,623,652 A | 4/1997 | Vora et al. | |
| 5,625,781 A | 4/1997 | Cline et al. | |
| 5,684,375 A | 11/1997 | Chaffee et al. | |
| 5,699,350 A | 12/1997 | Kraslavsky | |
| 5,734,831 A | 3/1998 | Sanders | |
| 5,790,977 A | 8/1998 | Ezekiel | |
| 5,793,954 A | 8/1998 | Baker et al. | |
| 5,801,689 A | 9/1998 | Huntsman | |
| 5,805,442 A | 9/1998 | Crater et al. | |
| 5,828,672 A | 10/1998 | Labonte et al. | |
| 5,835,507 A | 11/1998 | Huang et al. | |
| 5,862,391 A | 1/1999 | Salas et al. | |
| 5,950,006 A | 9/1999 | Crater et al. | |
| 5,975,737 A | 11/1999 | Crater et al. | |
| 5,982,362 A | 11/1999 | Crater et al. | |
| 5,990,884 A | 11/1999 | Douma et al. | |
| 5,997,167 A | 12/1999 | Crater et al. | |
| 6,014,414 A * | 1/2000 | Yamamoto et al. | 375/356 |
| 6,016,523 A | 1/2000 | Zimmerman et al. | |
| 6,028,866 A | 2/2000 | Engel et al. | |
| 6,032,203 A | 2/2000 | Heidhues | |
| 6,058,251 A | 5/2000 | Okamoto et al. | |
| 6,061,721 A | 5/2000 | Ismael et al. | |
| 6,111,888 A * | 8/2000 | Green et al. | 370/461 |
| 6,122,670 A | 9/2000 | Bennett et al. | |
| 6,134,522 A | 10/2000 | Fritz et al. | |
| 6,151,625 A | 11/2000 | Swales et al. | |
| 6,151,640 A | 11/2000 | Buda et al. | |
| 6,201,996 B1 | 3/2001 | Crater et al. | |
| 6,233,626 B1 | 5/2001 | Swales et al. | |
| 6,262,996 B1 * | 7/2001 | Kainulainen et al. | 370/503 |
| 6,263,487 B1 | 7/2001 | Stripf et al. | |
| 6,282,454 B1 | 8/2001 | Papadopoulos et al. | |
| 6,311,101 B1 | 10/2001 | Kastner | |
| 6,321,272 B1 | 11/2001 | Swales | |
| 6,327,511 B1 | 12/2001 | Naismith et al. | |
| 6,370,550 B1 | 4/2002 | Douma et al. | |
| 6,370,569 B1 | 4/2002 | Austin | |
| 6,424,872 B1 | 7/2002 | Glanzer et al. | |
| 6,434,157 B1 | 8/2002 | Dube et al. | |
| 6,453,210 B1 | 9/2002 | Belotserkovskiy | |
| 6,466,995 B1 | 10/2002 | Swales et al. | |
| 6,470,032 B1 * | 10/2002 | Dudziak et al. | 370/503 |
| 6,477,147 B1 * | 11/2002 | Bocking et al. | 370/236 |
| 6,484,061 B1 | 11/2002 | Papadopoulos et al. | |
| 6,505,341 B1 | 1/2003 | Harris et al. | |
| 6,519,263 B1 * | 2/2003 | Huth | 370/444 |

FOREIGN PATENT DOCUMENTS

| | | |
|---|---|---|
| DE | 44 10 171 C1 | 4/1995 |
| DE | 296 00 609 U1 | 3/1997 |
| DE | 196 15 093 A1 | 10/1997 |
| EP | 0 542 657 A1 | 5/1993 |
| EP | 0 814 393 A1 | 12/1997 |
| EP | 0 825 506 A2 | 2/1998 |
| EP | 1 107 500 A2 | 6/2001 |
| EP | 1 107 500 A3 | 6/2001 |
| JP | 60192447 A | 9/1985 |
| WO | WO 97/18636 | 5/1997 |
| WO | WO 98/53581 | 11/1998 |

OTHER PUBLICATIONS

Putnam, Frederick, "Public-domain IPC scheme moves Windows data 1000 times faster than DDE," Personal Engineering and Instrumentation News—Oct. 20, 1994, 15 pages.

1771 Control Compressor (Cat. No. 1771-DMC, -DMC1, -DMC4, and -DXPS) User Manual, Copyright 1994, Allen-Bradley Company, Inc., Publication 1771 Jun. 5, 1995-PM 865119-36, Dec. 1994.

Taylor, Ken and Trevelyan, James, "A Telerobot On the World Wide Web," Proceedings of the 1995 National Conference of the Australian Robot Association, Melbourne, Jul. 5-7, 1995, Sydney: Australian Robot Association Inc., pp. 108-118.

Article entitled, "LABTECHnet Frequently Asked Questions Updated Sep. 6, 1995," 3 pages.

Strauss, Richard, three page memo to LABTECH staff, with attached press release—For Release on Sep. 13, 1995 entitled, "Internet Goes Real-time with LAHBTECHnet," 3 pages.

Kao, James T, "Remote Microscope for Inspection of Integrated Circuits," MIT Masters Thesis; Sep. 1995, pp. 1-113.

Taylor, Ken and Trevelyan, James, "Australian Telerobot On the Web," 26th International Symposium on Industrial Robots, Oct. 4-6, 1995, pp. 40-44.

Putnam, Frederick, "LABTECHnet Visualization of a Weather Front," Oct. 15, 1995, 4 pages.

Putnam, Fredrick, "LABTECH News: Another superlative PR article!!!.," Oct. 26, 1995, 2 pages.

Soreide, N.N. et al., "Mosaic access to real-time data from the TOGA-TAO array of moored buoys," Computer Networks and ISDN Systems, Dec. 1995.

Disk Drive with Embedded Hyper-Text Markup Language Server (IBM Technical Disclosure Bulletin: Dec. 1995) [online]. Retrieved using Internet: <URL:http://www.delphion.com/tdbs/tdb?o~95A%2062530.>.

EDN Access for Design, By Design—Test & Measurement Jun. 6, 1996 [online]. Retrieved from EDN—Jun. 6, 1996 Test & Measurement using Internet: <URL:http://archives.e-insite.net/archives/ednmag/reg/1996/060696/12prod4.htm>.

Peryt, M. and Momal, F., "Generic Repository and Search Engine For LHC Equipment Test Data," International Conference on Accelerator and Large Experimental Physics Control Systems, 1999, Trieste, Jul., pp. 493-495.

Putnam, Frederick A., "Internet-Based Data Acquisition and Control" Sensors; Nov. 1999, pp. 1-5.

Goldberg, Ken et al; "Beyond the Web: Excavating the Real World Via Mosaic" [online], [retrieved on Apr. 3, 2001]. Retrieved from Beyond the Web Conference Paper using Internet: <URL:http://www.ncsa.uiuc.edu/SDG/IT9 . . . golberg.html>.

The "Only" Coke Machine on the Internet [online], [retrieved on Apr. 10, 2001]. Retrieved using Internet: <URL:http://www.cs.cmu.edu/~coke/history_long.txt>.

CD-ROM's in the Microwave—What do you do [online], [Retrieved on Jun. 20, 2001]. Retrieved using Internet: <URL:http://www.hamjudo.com/notes/cdrom.html>.

Welcome to Paul Haas's web server—Welcome to a historic website [online], [retrieved on Jun. 20, 2001]. Retrieved using Internet: URL:http://www.hamjudo.com/notes/cdrom.html>.

Status of Paul's (Extra) Refrigerator at Wed Jun. 20 14:32:09 EDT 2001 [online], [retrieved on Jun. 20, 2001]. Retrieved using Internet: <URL:http://www.hamjudo.com/cgi-bin/refrigerator>.

Soda Can platform [online], [retrieved on Jun. 20, 2001]. Retrieved using Internet:URL:http://www.hamjudo.com/notes/soda_platform.html>.

Tub status as of Wed Jun. 20 14:44:54 EDT 2001 [online], [retrieved on Jun. 20, 2001]. Retrieved from Paul's Hottub status using Internet: <URL:http://hamjudo.com/cgi-bin/hottub>.

Frequently asked questions about Paul's Hottub [online], [retrieved on Jun. 20, 2001]. Retrieved from hottub notes and sources using Internet: <URL:http://hamjudo.com//hottub-notes.html>.

The Cal Poly Computer Society's Robotics Resources Page [online], [retrieved on Jun. 20, 2001]. Retrieved from Computer Society Robotics Resources Page using Internet: URL:http://www.elee.calpoly.edu/clubs/cs/www/RoboContest>.

News—aX announces Support for Opto 22 Ethernet B3000 Devices—Sep. 13, 2001 [onlin]. Retrieved from automationX using Internet: <URL:http://www.mnrcan.com/newsdetail.phtml?idno=25>.

Miscellaneous Web pages and documents from LABTECH High Performance Data Acquisition & Process Control Software—20 Years of Industry Innovation in Real-time PC Measurement and Control [online], [retrieved Sep. 18, 2001] Retrieved from LABTECH—20 Years of Industry Innovation in . . . using Internet: <URL:http://www.labtech.com>.

The Trojan Room Coffee Machine [online], [retrieved on Sep. 19, 2001]. Retrieved using Internet: <URL:http://www.cl.cam.ac.uk/coffee/coffee.html>.

Stafford-Fraser, Quentin, "The Trojan Room Coffee Pot A (non-technical) biography" [online], [retrieved on Sep. 19, 2001]. Retrieved using Internet: <URL:http://www.cl.cam.ac.uk/coffee/qsf/coffee.html>.

Stafford-Fraser, Quentin, "The Story of the Trojan Room Coffee Pot A Timeline" [online], [retrieved on Sep. 19, 2001]. Retrieved using Internet: <URL:http://rr-vs.informatik.uni-ulm.de/rr/LayoutControl.html>.

From Web Server to Railroad Layout Interactive Model Railroad [online], [retrieved on Sep. 19, 2001]. Retrieved using Internet: <URL:http://rr-vs.infromatik.uni-ulm.de/rr/LayoutControl.html>.

News Interactive Model Railroad [online], [retrieved on Sep. 19, 2001]. Retrieved using Internet: <URL:http://rr-vs.informatik.uni-ulm.de/rr/WhatsNew.html>.

Frequently Asked Questions Interactive Model Railroad [online], [retrieved on Sep. 19, 2001]. Retrieved using Internet <URL:http://rr-vs.informatik.uni-ulm.de/rr/FAQ.html>.

Stafford-Fraser, Quentin, "The Life and Times of the First Web Cam—When convenience was the mother of invention". [online], [retrieved on Sep. 19, 2001]. Retrieved using Internet: <URL:http://www.cl.cam.ac.uk/coffee/qsf/CACM200107.html>.

AX Process Control [online], [retrieved on Sep. 24, 2001]. Retrieved from automationX Process Control using Internet: <URL:http://www.mnrcan.com/ProcessControl.phtml>.

Goldberg, Ken and Mascha, Michael, "Mercury Project Aug. 1994-Mar. 1995," [online], [retrieved on Sep. 2001]. Retrieved using <URL:http://www.usc/edu/dept/raiders>.

Momal, F., et al., "A Control System based on Industrial Components for Measuring and Testing Prototype Magnets for LHC," [online], [retrieved on Oct. 9, 2001]. Retrieved from A Industrial Control System for Testing the Magnets for LHC using Internet: <URL:http://mish231.cern.ch/Docs/CS/bIC.html>.

Bradford Robotic Telescope—Intro [online], [retrieved on Nov. 15, 2001]. Retrieved from Introduction to the Bradford Telescope using Internet: <URL:http://www.telescope.org/rti/intro.html>.

Xavier has a new job! [online], [retrieved on Nov. 15, 2001]. Retrieved using Internet: <URL:http://www-2.cs.cmu.edu/Groups/xavier/www/papers/html>.

Bibliography [online], [retrieved on Nov. 16, 2001] Retrieved from Xavier Papers using Internet: <URL:http://www-2.cs.cmu.edu/Groups/xavier/www/papers/html>.

Web page retrieved on Nov. 16, 2001. Retrieved using Internet: <URL:http://www.awe.com/mark/wwwf94/coxfig3.gif>.

Cox, Mark and Baruch, John, "Robotic Telescopes: An Interactive Exhibit on the World-Wide Web," [online], [retrieved on Nov. 16, 2001]. Retrieved from Robotic Telescopes Paper using Internet: URL:http://www.awe.com/mark/wwwf94/wwf94.html>.

About LabCam [online], [retrieved on Nov. 28, 2001] Retrieved using Internet: <URL:http://people.cs.uchicago.edu/~peterp/LabCam/aboutLabCam.html>.

Scharf, Ronald et al, "Using Mosaic for Remote Test System Control Supports Distributed Engineering" [online], [retrieved on Oct. 21, 2003]. Retrieved using Internet: <URL:http://archive:ncsa.uici.edu/SDG/it94/Proceedings/CSCW/scharf/scharf.html>.

Article entitled, "Installing and Using LABTECHnet," 2 pages, undated.

Communication from the European Patent Office including International Search Report from WO 03/100611, mailed Jul. 9, 2003.

Communication from the European Patent Office including International Search Report from WO 03/088620, mailed Sep. 17, 2003.

Communication from the European Patent Office including International Search Report from WO 03/085921, mailed Oct. 9, 2003.

Communication from the European Patent Office including International Search Report from WO 99/48245, mailed Oct. 25, 1999.

Kubota, Y, et al., NTT Human Interface Laboratories, "Proposal of the Robot System With Information Sending Mechanism," Presented at the 14th Annual Conference of the Robotics Society of Japan, Nov. 1-3, 1996, pp. 341-342. (In Japanese w/ English translation included).

Picon, Gerard, Schneider Automation, "Java and Programmable Automation Controllers," *CiMax: Edition Terrain*, No. 13—May/Jun. 1997 (in French w/ English translation included).

Brugger, Peter, "Web Technology in Embedded Computing, " *Industrial Computer 97—Special Edition*: Sep. 3, 1997 (in German w/ English translation included).

Williams, Tom, et al., "Java Goes to Work Controlling Networked Embedded Systems," *Computer Design*, Aug. 1996, pp. 36.

Fu, K.S., et al., *Robotics: Control, Sensing, Vision and Intelligence*, Chapter Five: Control of Robot Manipulators; Sections 5.1-5.3.1.

*Automation Strategies*, by Automation Research Corporation, Feb. 1998, pp. 1-32.

Lecuivre, J., et al., *A framework for validating distributed real time applications by performance evaluation of communication profiles*, Factory Communication Systems, 1995, WFCS '95, Proceedings, 1995 IEEE International Workshop on Leysin, Switzerland Oct. 4-6, 1995, New York, NY, pp. 37-46.

*Modicon Modbus Protocol Reference Guide*, Modicon, Inc., Jun. 1996, pp. 1-12.

Swales, Andy, *Topology Considerations for Modbus/Therenet Automation Networks*, Law Controls, Inc., Jan. 25, 2000.

Beaupre, Jacques, et al., *Advanced Monitoring Technologies for Substations*, IEEE, Oct. 9, 2000, pp. 287-292.

Mostafa, W., et al., *A Taxonomy of Multicast Protocols for Internet Applications*, Computer Communications, Elsevier Science Publishers BV, Amsterdam, NL, vol. 20, No. 16, 1998, pp. 1448-1457.

Preston, David J., Internet Protocols Migrate to Silicon for Networking Devices, *Electronic Design*, vol. 45, No. 8, Apr. 14, 1997, pp. 87-90.

Klesper, Tilo, "Der Internet-Zugriff Aufs Lon Weltweiter Zugriff Auf Die Sensorik Und Aktorik Von Automatisierungs-Projekten", *Elecktronick*, vol. 47, No. 8, Apr. 14, 1998, pp. 60, 62, 64, 66.

Abstract of "Implementing distributed controls for FMC's using Internet utilities," S. S. Jagdale and N. Merchant; Computers of Industrial Engineering, vol. 31, No. 1-2, p. 87-90; Oct., 1996 (UK).

Abstract of "Process control takes to the Net," G. Paula; Mechanical Engineering, vol. 118, No. 12, p. 55, Dec., 1996.

Abstract of "Remote interrogation and control of sensors via the internet," Peter L. Furh and Euan F. Mowat; Sensors, vol. 12, No. 12, 6 pp; Dec. 1995.

Abstract of "Implementation of CAN/CAN bridges in distribution environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

Abstract of "Managing interdisciplinary project teams through the Web," R. E. Goodman and P. Chinowsky; Conference Paper, WebbNet 96—World Conference of the Web Society, pp. 180-185, 1996.

Abstract of "Learning environment for a process automation system using computer networks,"J. Lindfors, L. Yliniemi and K. Leivska; Conference Paper, Step '96—Genes, Nets and Symbols, pp. 137-143, 1996 (Finland).

Abstract of "Distributed agent systems for intelligent manufacturing,"D. H. Norrie and B. R. Gaines; Canadian Artifical Intelligence, No. 40, p. 31-3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353-8, 1996 (UK).

Abstract of "Chemical-better batch controls," T. Crowl; Control & Instrumentation, vol. 28, No. 5, p. 53-4, May 1996 (UK).

Abstract of "Industrial software does 32-bit Windows, prepares for the net," W. Labs; I 8CS, vol. 69, No. 3, p. 23-6, 31-4, Mar. 1996, USA.

Abstract of "A case study for international remote machining;" G. C. I. Lin and Kao Yung-Chou; Conference Paper, Proc. SPIE-Int. Soc. Opt. Eng., vol. 2620, p 553-60, 1995.

Abstract of "Standardization of long-distance protocols," R. Dinges; Journal Paper, Generation Changes in Network Conductor Systems, ITG—Fachberichte, vol. 134, p. 97-113, 1995 (West Germany).

Abstract of "Control system design V. Communications orchestrate process control," F. Glow; In Tech, vol. 36, No. 9, p. 68-74, Sep. 1989.

Abstract of "Functions and characteristics of local networks adapted to industrial applications,"J. Morlais; Electronique Industrielle, No. 97, p. 56-63, Nov. 15, 1985; France.

Abstract of "Intelligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

Abstract of "Simulation on the integration of process control systems of rolling mill plants through standard networks. "Choo Young Yeol, Hwang Hwa Won and Kim Cheeha, Proceedings of the Industrial Computing Conference, Instrument Society of America, Research Triangle Park, NC, USA. P 1-14; vol. 6, No. 1, 1996.

Abstract of "Environmental waste control digest," Clayton H. Billings; Public Works vol. 127 No. 7, 6 pp, Jun., 1996.

Abstract of "Experiments in tele-handling and tele-machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts-on-demand on the national network," Fred Hansen, Elias Pavlakos, Eric Hoffman, Takeo Kanade, Raj Reddy, Paul Wright: Journal of Manufacturing Systems, vol. 12 No. 4, p. 269-281: 1993.

Abstract of "Mathematical model and optimization of furfural treating process," Tao Peng, Jinshoo Yu and Huibe Shao; Huadong Huagong Xueyuan Xuebao/Journal of East China Institute of Chemical Technology vol. 17 No. 1, p. 99-104: Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5. p. 475-81, Fig. 3, Ref. 7, 1995, (Japan).

Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995. (Japan).

Abstract of "Users'experience with software tools for process integration. General results" Stougie, L.; Roeterink, H.J.H.; Van Wijk, A.; Stikkelman, R.M.; Nov. 1996.

Abstract of "Integrated design and process technology. vol. 1" Cooke, D.; Kraemer, B.J.; Sheu, P.C.Y.; Tsai, J.P.; Mittermeir, R.; Society for Design and Process Science, p. 51-57; 1996. (USA).

Abstract of "Integrated design and process technology. vol. 2" Tanik, M.M.; Bastani, F.B.; Gibson, D.; Fielding, P.J.; Society for Design and Process Science, p. 423-430, 1996. (USA).

Abstract of "Need low-cost networking consider DeviceNet, " W. H. Moss; InTech vol. 43:11;p. 30-31, Nov. 1996.

"Plastic Car Bodies Pass the Crash Test," mechanical engineering vol. 118, No. 12; Dec. 1996.

http://www.adeptscience.com/archive_pressroom/html/labtechnet.html; Adapt PressRoom Archives. A collection of Adept Scientific's archive news releases. "Hot Coffee on the Internet!".

When Technology Standards Become Counterproductive, Kenneth C. Crater, President, Control Technology Corporation, Hopkinton, MA dated Jul. 9, 1999, pp. 1-5.

A White Paper State Language for Machine Control, Kenneth C. Crater, President , Control Technology Corporation, Hopkinton, MA dated Jul. 9, 1999, pp. 1-11.

New PC-based Process Control & Data Acquisition Software Integrates Remote Internet Capabilities with Fast Pentium Support, Fred A. Putnam, LABTECH President, pp. 1-3.

Aug. 1996 CONTROL Magazine—In The News B Electric Utility Industry Embarks on Automation Overhaul, pp. 1-10.

Jul. 1997 CONTROL Magazine B Magazine Software Review B NT Package Give Plant Access Through the Web, pp. 1-3.

Oct. 1996 CONTROL Magazine B Software Review—Article Archives, pp. 1-2.

ICS Instrumentation & Control Systems B Windows NT for real-time control: Which way to go?—ICS Magazine, pp. 1-8.

I&CS Jul. 1999—Special Report Software—Software: Open source OSs, objects, Web-based communications challenge status quo, (Wayne Labs, Senior Technical Editor), pp. 24-49.

Landis & Staefa MS 2000, pp. 1-2.

Landis & Staefa Standards and Open Protocols Integration System Architecture, p. 1.

Annabooks Bookstore, Programming and Interfacing the 8051, by Sencer Yeralan and Asutosh Ahluwalia, pp. 1-2.

SoftPLC Corporation—Java Support in SoftPLC Corp. Products, pp. 1-5.

Mach J. Company, MachJ, an embeddable, clean room Java Virtual Machine, p. 1.

SoftPLC Corporation—The History of Programmable Controllers, Looking Back From the Year 2000 A.D. (Or, How Computers Replaced Proprietary PLC'S), pp. 1-7.

SoftPLC Corporation—TOPDOC: Advanced PLC program development & documentation software, pp. 1-12.

Control Engineering Online Magazine Articles (Jul. 1998) —No, that's not a PC, it's a PLC, pp. 1-2.

Rockwell International Corporation, Allen-Bradley Introduces PLC-5/80E Controller for Ethernet Communication Networks, pp. 1-2.

Rockwell Automation—Search Results, pp. 1-2.

Rockwell International Corporation, Vision & Direction, The Direction of Automation Systems, pp. 1-4.

Rockwell International Corporation, Vision & Direction, The Role of Open Systems, pp. 1-4.

Rockwell International Corporation—Vision & Direction—The Direction of Automation Systems—Emergence of Application-Specific Control Solutions, pp. 1-2.

Rockwell International Corporation—Vision & Direction—The Direction of Automation Systems—The New Factory Worker, pp. 1-2.

Rockwell International Corporation, Vision & Direction, Control System Deliverables—The Next Step, pp. 1-2.

Rockwell International Corporation, Vision & Direction, Conclusion & Acknowledgments, pp. 1-2.

Rockwell International Corporation—Choices—Perspectives on the Future of Automation Control, p. 1.

Rockwell International Corporation—Allen-Bradley—Networks—Ethernet for Industrial Control—An Ethernet White Paper—Apr. 21, 1998, pp. 1-13.

Rockwell International Corporation—Automation Systems Control—General—World-Class Automation Systems from Allen-Bradley, Last Updated: May 7, 1998, pp. 1-12.

PC Quest, Dec.>97—Point, click, Control—C-Programmable controllers take the pain out of embedded control, pp. 1-2.

Berthel—automation with imagination—PCI 100—Programmable logic controller for SIMATIC/IBM IPC, pp. 1-3.

YAHOO! Personalized Searh Results for programmable logic controller internet access, pp. 1-3.

SIEMENS—SIMATIC report Jan. 1997—New in the SIMATIC Library, pp. 1-2.

CONTROL Magazine Aug. 1998 B Field Test—Dynamic Software Makes Control Integration Easier, pp. 1-2.

Design and Reuse Web Site—EDTN Network—Analyze IP Database Content—Analyze Reuse Blocks per taxonomy tree, pp. 1-10.

Engineering Information, Inc.—Ei CPX WEB [1990-94].

Using World Wide Web for Control Systems, F. Momal, C. Pinto-Pereira, AT Division CERN, 1211 Geneva 23, http://mish231.cern.ch/Docs/ICALEPCS/1995/icalep95.htm.

"Ethernet Base Gateway Product," AEG-Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB-TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"[comp.unix.programmer] Unix-Socket-FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winsock 2 Information," Bob Quinn, 1995-1998 (last updated Dec. 5, 1998).

Website Information of PROFIBUS: Technical Overview.

Website Information ODVA—The Open DeviceNet's Vendor Association.

Website of PROFIBUS International—Welcome Page.

LabVIEW Graphical Programming for Instrumentation, Networking Refernce Manual, 8 Copyright 1993, 1994 National Instruments Corporation, Part No. 320593B-01, Sep. 1994.

LabVIEW Graphical Programming for Instrumentation, Tutorial for Windows, 8 Copyright 1993, 1994 National Instrument Corporation, Part No. 320593B-01,Sep. 1994.

LabVIEW Graphical Programming for Instrumentation, Data Acquisition VI Reference Manual for Windows, 8 Copyright 1992, 1994 National Instruments Corporation, Part No. 320536B-01, Sep. 1994.

RFC 1533 "DHCP Options and BOOTP Vendor Extensions", (http://ietf.org/rfc/rfc1533.txt) IETF, Oct. 1993.

RFC 1534 "Interoperation between DHCP and BOOTP", (http://ietf.org/rfc/rfc1534.txt) IETF, Oct. 1993.

RFC 2131 "Dynamic Host configuration Protocol"((http://ietf.org/rfc/rfc21231.txt) IETF, Mar. 1997.

SOAP, Simple Object Access Protocol (1.1) W3C Note May 8, 2000, (http://www.w3.org/TR/2000/NOTE-SOAP-20000508.

Statement of Ken Crater pertaining to awareness of LABTECHnet technology, 1 page.

*PCT Search Report for PCT/US99/05675.

*Walid Mostafa, Mukesh Singhal, "*A Taxonomy of Mulicast Protocols For Internet Applications*," Jul. 18, 1997 from Computer Communications 20 (1998) 1448-1457.

*Tilo Klesper, "Der Internet-Zugriff aufs LON," Aug. 1998 from Automatisieren.

*David J. Preston, "Internet Protocols Migrate to Silicon For Networking Devices" from Electronic Design, Apr. 14, 1997.

*TIBCO Website, (www.rv.tibco.com) for TIB/Rendezvous.

*TIBCO Software, Inc. "TIB/Rendevous Concepts", Release 4.1, Nov. 1997.

IEEE Std 802.11a-1999 (Supplement to IEEE Std 802.11-1999 "Part 11: Wireless LAN Medium Access Control (MAC) and Physical Layer (PHY) specifications Higher-speed Physical Layer in the 5 GHz Band" [.Adopted by ISO/IEC and redesignated as ISO/IEC 8802-11:1999/Amd 1:2000(E)].

P802.1p/D4 Sep. 6, 1966 "P802.1p Standard for Local and Metropolitan Area Networks—Supplemental to Media Access Control (MAC) Bridges: Traffic Class Expediting and Dynamic Multicast Filtering".

SOAP, [online], [retrieved on Aug. 5, 2002]. Retrieved from MSDN Online—Default Home Page using Internet <URL: http://msdn.microsoft.com/nhp/ default. asp?contentid=28000523&frame= true>.

PROCOMM Plus—The Leader in terminal emulation, [online], [retrieved on Jan. 13, 2002]. Retrieved from the consumer web page of Symantec, Inc. using Internet <URL: http://www.symantec.com/procomm>.

DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http://www.cs.utk.edu/~shuford/terminal/dec.html>.

NetReachJ Model TPS-2, TelnetPower Switch 2001, [online], [retrieved on Jan. 13, 2002]. Retrieved from Model TPS-2 Telnet + Dial-Up Remote Power Manager, Remote Reboot of Servers, Route . . . using Internet <URL:http://www.wti.com/tps2.htm>.

ANSI.SYS, [online], [retrieved on Jan. 13, 2002]. Retrieved from ANSI.SYS B ansi terminal emulation escape sequences using Internet URL:http://enterprise.aacc.cc.md.us/~rhs/ansi.html>.

Skonnard, Aaron, ASOAP: The Simple Object Access Protocol, [online], [retrieved on Jul. 30, 2002]. Retrieved from SOAP: The Simple Object Access Protocol—MIND Jan. 2000 using Internet <URL:http://www.microsoft.com/Mind/0100/soap/soap.asp>.

Extensible Markup language (XML)—W3C Working Draft Aug. 7, 1997, [online], [retrieved on Aug. 1, 2002]. Retrieved from Extensible Markup Language (XML) website using Internet <URL:http://www.w3.org/TR/WD-xml-970807.htm>.

Multi-Tech Systems Granted Modem Firmware Upgrade Patent, Apr. 5, 2000, [online], [retrieved on Jan. 3, 2002]. Retrieved from Multi-Tech Press Release using Internet <URL:http://www.multitech.com/NEWS/releases/2000/183.html>.

Remote Interrogation and Control of Sensors via the Internet, Sensors and Systems; Peter L. Fuhr and Euan F. Mowat; University of Vermont; pp. 25-30; Dec. 1999.

* cited by examiner

METHOD AND APPARATUS FOR ETHERNET PRIORITIZED DEVICE CLOCK SYNCHRONIZATION

CROSS REFERENCE TO RELATED APPLICATIONS

This patent application is being filed concurrently with commonly assigned U.S. Patent Application entitled, "A Method For Managing Bandwidth On An Ethernet Network", Ser. No. 10/063,242, filed Apr. 1, 2002; the content of which is expressly incorporated herein by reference. This patent application is related to U.S. Pat. No. 6,223,626 entitled "SYSTEM FOR A MODULAR TERMINAL INPUT/OUTPUT INTERFACE FOR COOMUNICATING MESSAGE APPLICATION LAYER OVER ETHERNET TO TRANSPORT LAYER;" the content of which is expressly incorporated herein by reference. This patent application is a continuation in part of and claims priority to U.S. patent application entitled "COMMUNICATION SYSTEM FOR A CONTROL SYSTEM OVER ETHERNET AND IP NETWORKS," Ser. No. 09/623,689, filed Sep. 6, 2000; the content of which is expressly incorporated herein by reference.

BACKGROUND OF INVENTION

1. Technical Field

The present invention relates generally to synchronization of control system device clocks through a communication network. More specifically, the present invention relates to accurate Ethernet synchronization of device clocks using IEEE 802.1p protocol.

2. Background of Invention

The Institute for Electrical and Electronic Engineers (IEEE) defines the Ethernet standard as IEEE Standard 802. This standard establishes an Ethernet network configuration guideline and specifies how elements of an Ethernet network interact. Network equipment and protocols can communicate efficiently when adhering to the IEEE standard.

Network protocols are standards that allow devices to communicate. A protocol defines how network devices identify one another. Another protocol defines the format of the transmitted data and how the data gets processed once it reaches its destination. Protocols such as transmission control protocol/internet protocol (TCP/IP) (for UNIX, Windows NT, Windows 95 and other platforms) also define procedures for handling lost or damaged transmissions or "packets".

Quality of service in the TCP/IP is made up of five layers, i.e. application, transport, network, data, and physical layers. The application layer is for application and user access, authorization, and encryption. The transport layer has TCP rate control and port access control. The network layer balances loads, reserves resources, and contains type of service bits, and path controls. The data link layer is where IEEE802.1p/Q frame prioritization takes place as well as logical port access control. Finally, the physical layer has bit error correction, physical security and port access. Ethernet is a shared media with rules for sending packets of data. These rules protect data integrity and avoid conflicts. Nodes determine when a network allows packets to be sent. In industrial control applications, it is possible for two nodes at different locations to send data concurrently. When both devices transfer a packet to the network concurrently, a collision will result.

Minimizing these collisions in factory automation applications is a critical portion of the design and operation of their networks. An increase of collisions in industrial control environments is frequently caused by increases of control-system devices on the network. This creates contention for network bandwidth and slows network performance.

Network quality of service is important for proper and predictable industrial control system performance. There are a number of factors that may diminish network performance. The first is delay, which is the time a packet takes to go from the sender to the receiver device via the network. Long delays put greater stress on the transport protocol to operate efficiently, particularly motion control, drives and robots applications. Long delays imply large amounts of network data held in transit. Delays affect counters and timers associated with the protocol. In the TCP protocol, the sender's transmission speed is modified to mirror the flow of signal traffic returning from the receiver, via the reply acknowledgments (ACK's) that verify a proper reception. Large delays from senders and receivers make the feedback loop insensitive. Delays result in the protocol becoming insensitive to dramatic short-term differences in industrial control system network load. Delays affecting interactive voice and video applications cause systems to appear unresponsive.

Jitter is another network transit delay. Large amounts of jitter cause the TCP protocol to conservatively estimate the round trip message time. This creates inefficient factory automation protocol operation by requiring timeouts to reestablish the flow of data. A large quantity of jitter in user datagram protocol (UDP) based real time applications such as an audio or video signal is intolerable. Jitter creates distortion in the signal, which then must be cured by enlarging the receiver's reassembly playback queue. The longer queue delays the signal, making interactive communication difficult to maintain, detrimentally for factory automation.

A third network issue is its bandwidth, the maximal industrial control data transfer rate. Bandwidth may be restricted by other traffic that shares common elements of the route as well as the physical infrastructure limitations of the traffic path within the factory automation transit network.

Reliability is yet another industrial control system concern. Network reliability may be measured by the average error rate of the medium. Improperly configured and poorly performing switching systems may change the order of packets transmitted. Packets may be delivered to the receiver in a different order than what was sent. Packets could possibly be dropped while in transient routing loops. Industrial control network transit paths that are not reliable or that are prone to error may also require the lost packets to be sent another time. TCP does not differentiate between messages lost because of packet corruption and messages lost because of network congestion. The sender is subject to the same congestion avoidance behavior responses when packets are lost. The industrial control network reacts by reducing message rates even more and forcing congestion avoidance algorithms despite the fact that no actual congestion was experienced on the network. Poor reliability in voice and video UDP applications causes distortion in the original analog signal at the receiver's end.

Ethernet's general lack of message prioritization and the openness of the TCP/IP protocol may introduce latent performance flaws relating to network traffic. Industrial control network traffic bursts can result in message losses and slow responses caused by non-critical network traffic. Categorizing traffic may be implemented to ensure that critical factory automation traffic will always flow despite the demands of less important applications. The prioritization of industrial control network traffic enables predictable performance for the most critical application traffic.

IEEE802.1p standard defines how network frames are tagged with user priority levels ranging from 7 highest to 0 lowest priority. IEEE802.1p compliant network infrastructure devices, such as switches and routers, prioritize network traffic delivery according to the user priority tag. Higher priority tagged frames are given precedence over lower priority or non-tagged frames. This means that time critical data receives preferential treatment over data that is not considered time critical.

Quality of service mechanisms can be incorporated at any or all of the five layers of the TCP/IP stack and the positioning of the key quality of service mechanisms. Some of these mechanisms are inherent in the protocols rather than being explicitly added on for quality of service control.

Ideally, networks provide services to an unlimited number of users, at any number of locations, without any limitations on what can be transported. Industrial control systems should have well-specified delays in service access or usage, with contained packet loss rates, and without any congestion. The grade of service for a specific traffic flow is decided by the user/system that is generating the flow. Service quality is also influenced by enterprise administrators who control the budget. Network managers in charge of one of the network components are another factor. Even a service provider that supplies the WAN facilities influences service. By defining a small number of classes of service, the network allows for packet differentiation, maintains an acceptable quality of service, and yet still provides the services at reasonable cost and complexity.

Accurate clock synchronization is particularly critical in industrial control applications where multiple network components request proper timing. Fast synchronization of all device clocks is required through networks, with preferably, a deviation of less than a few hundred microseconds. At initialization, devices start their clocks when prompted and therefore their times differ from one another. The desire is for all initializations to occur as close to simultaneous as possible. When timing is not concurrent between multiple industrial control devices on the same network, real time data exchange quality of service suffers.

Motor control, drives, robots, factory automation, and electrical distribution are just a few of the potential applications for industrial controls linked with Ethernet. Minimizing the timing differences between industrial control device clocks is much more important than in most Ethernet applications and therefore is a desired goal.

SUMMARY OF INVENTION

It is an object of the invention to provide an Ethernet industrial control system for transferring messages, wherein the messages are tagged with identifiers of varying levels of priority, ranging from a highest priority to a lowest priority.

In accordance with the invention, the system comprises a serial network bus and a means for placing a message having a higher priority identifier onto the bus before placing a message with a lesser priority identifier onto the serial network bus.

Other features and advantages of the present invention will be apparent from the following specification taken in conjunction with the following drawings.

DETAILED DESCRIPTION

Figure 1:
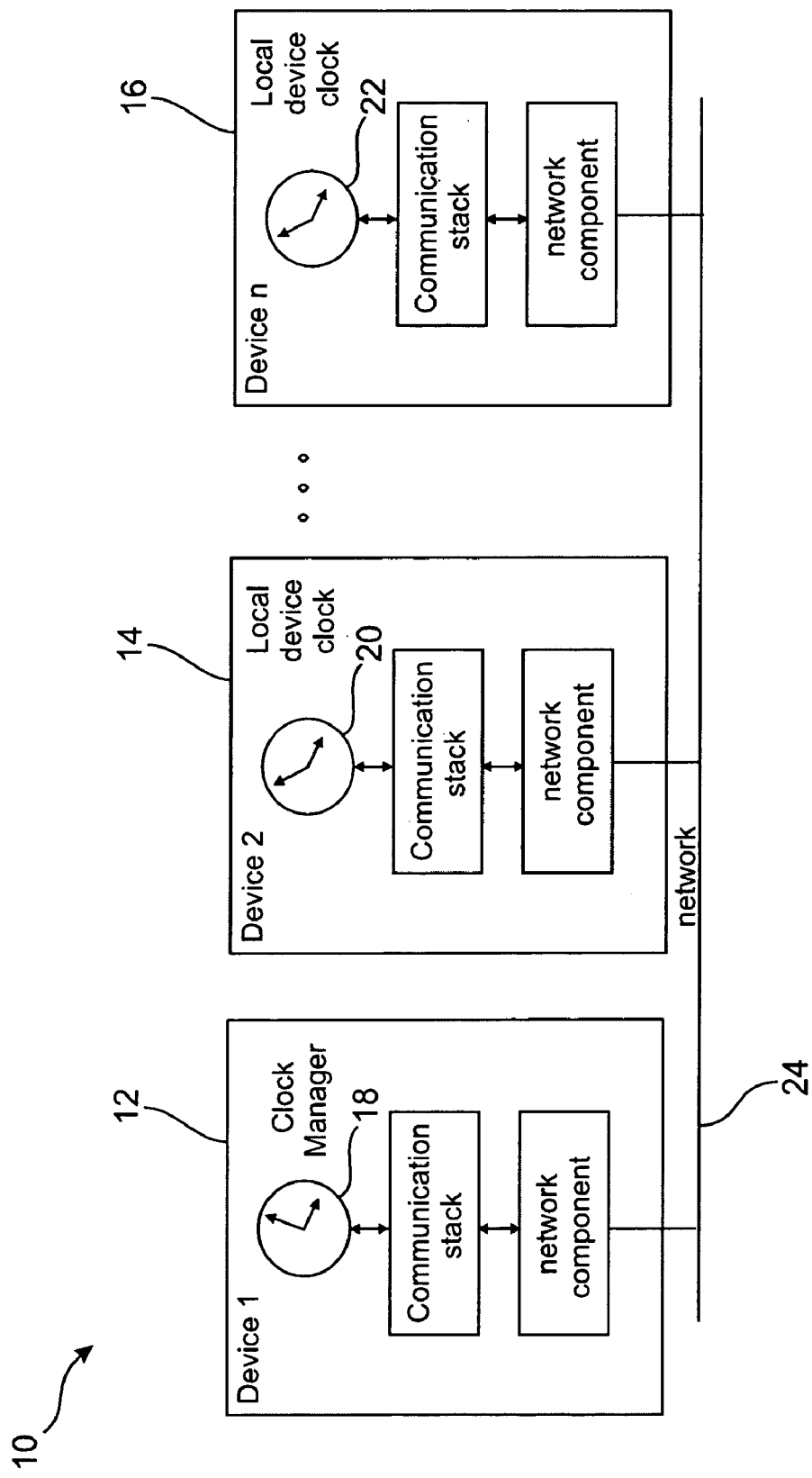
FIG. 1 is a simplified block diagram of a network with n devices.

While this invention is susceptible of embodiments in many different forms, there is shown in the drawings and will herein be described in detail a preferred embodiment of the present invention with the understanding that the present disclosure is to be considered as an exemplification of the principles of the invention and is not intended to limit the broad aspect of the present invention to the embodiment illustrated.

The quality of service characteristics of an industrial control network can be managed using mechanisms operating at the edge of the network or within its core. Quality of service may be controlled by reserving a fixed amount of bandwidth for mission-critical applications or preventing specific users from accessing restricted data like WWW destinations.

Assigning a higher priority to traffic to and from specific customers, limiting the bandwidth that can be consumed by voice over IP traffic, or designating which types of traffic may be dropped when congestion occurs are other quality of service controls. End-to-end solutions include regulating individual or traffic flows, processing quality of service information within the network, and monitoring the configuration of the network.

At initialization, devices start their clock and so, they differ from each other. Real time data exchanges like clock synchronization, global data or IO scanning should be deterministic and should have guaranteed time delivery, whatever other traffic is on the network.

Class based queuing allows traffic to be divided into a hierarchy of classes that are determined by quality of service attributes. IEEE802 provides for 8 levels of message priority. Class based queuing also allows borrowing of bandwidth among the classes. Queuing mechanisms can be pre-configured. The traffic flow through an Ethernet stack architecture can be implemented through a policy-based management system, or can be controlled via user-driven signaling protocols. Ethernet strikes a balance between speed, cost and ease of installation. Preferably, clock synchronization frames are tagged with the highest network priority level.

Prioritization of traffic on an industrial control local area network (LAN) allows synchronization requirements to be signaled to LAN switches and routers. The IEEE802.1p specification defines three bits within the IEEE802.1Q field in the MAC header, a part of the open systems interconnection (OSI) Layer 2. The IEEE802.1Q field is designed to support virtual-LAN (VLAN) interoperability and to support traffic priorities. VLAN allows the use of multiple, logical, virtual Ethernets over a single physical Ethernet. Three bits support up to 8 settings, used for classes of traffic and priorities.

A reduced UDP/IP communication stack enables messages to be put on a serial network bus faster than ordinary communication stacks. Device clock synchronization messages preferably receive the highest priority level tags and additionally are transmitted through a reduced UDP/IP communication stack, optimizing clock synchronization. Implementation of message priority tagging and the use of a reduced UDP/IP communication stack for clock synchronization creates improved accuracy of all network device clocks, preferably with an accuracy of less than a few hundred microseconds.

Referring to FIG. 1, an Ethernet based industrial control system 10 for properly synchronizing local device clocks 20, 22 to the clock manager 18 is illustrated. FIG. 1 is a block diagram of one embodiment of the present invention. There is fast synchronization of all device clocks 20, 22, through the network 24, with accuracy less than a few hundred microseconds.

Figure 2:
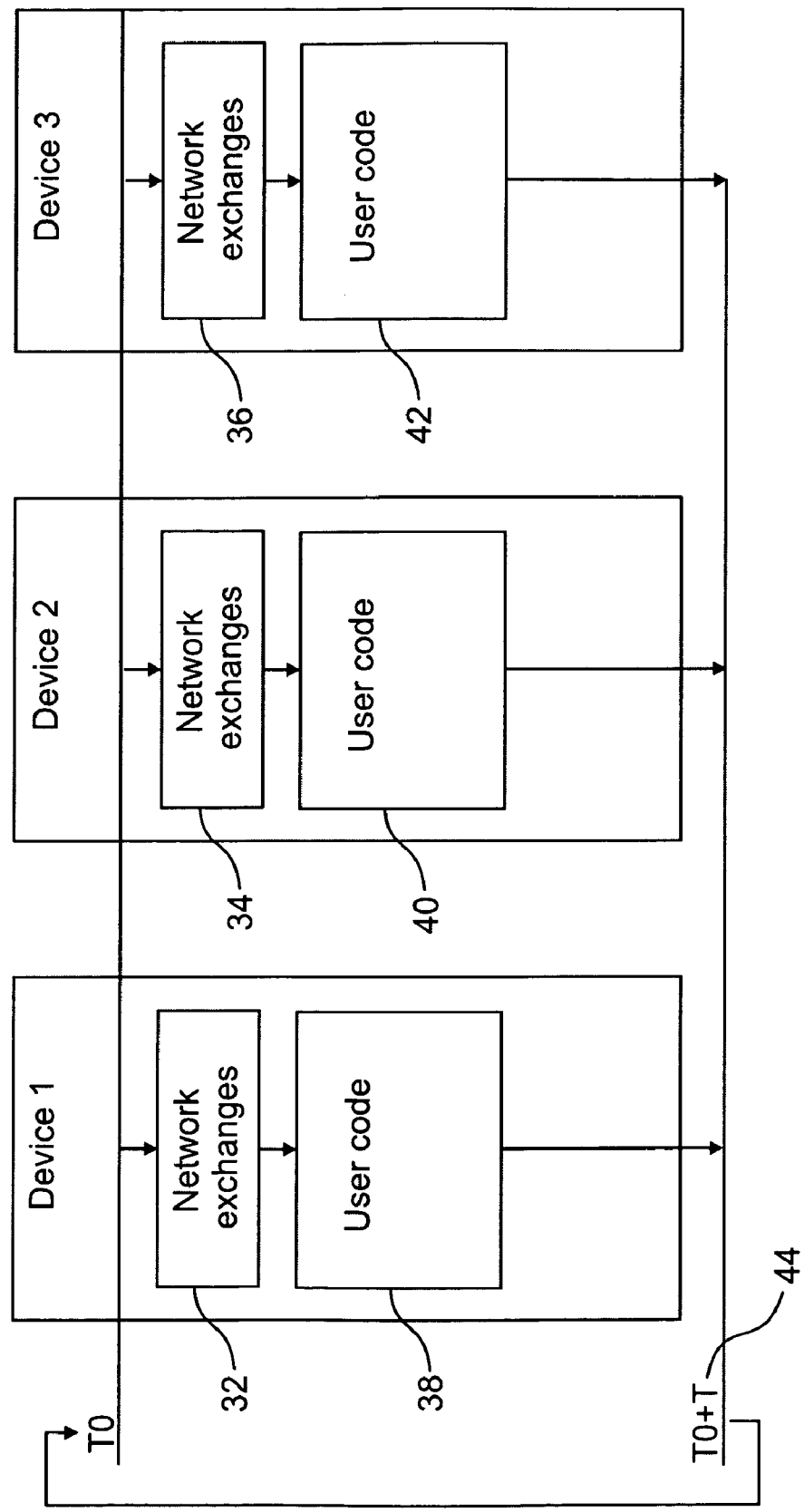
FIG. 2 is a simplified block diagram of network exchanges and code execution.

Referring to FIG. 2, network exchanges 32, 34 and 36 and user code executions 38, 40, and 42 are synchronously scheduled. This diagrams the synchronous scheduling of network exchanges 32, 34 and 36 and of code execution 38, 40, and 42 where all devices have consistent data when starting code execution and distributed control capacity 44 is provided.

Figure 3:
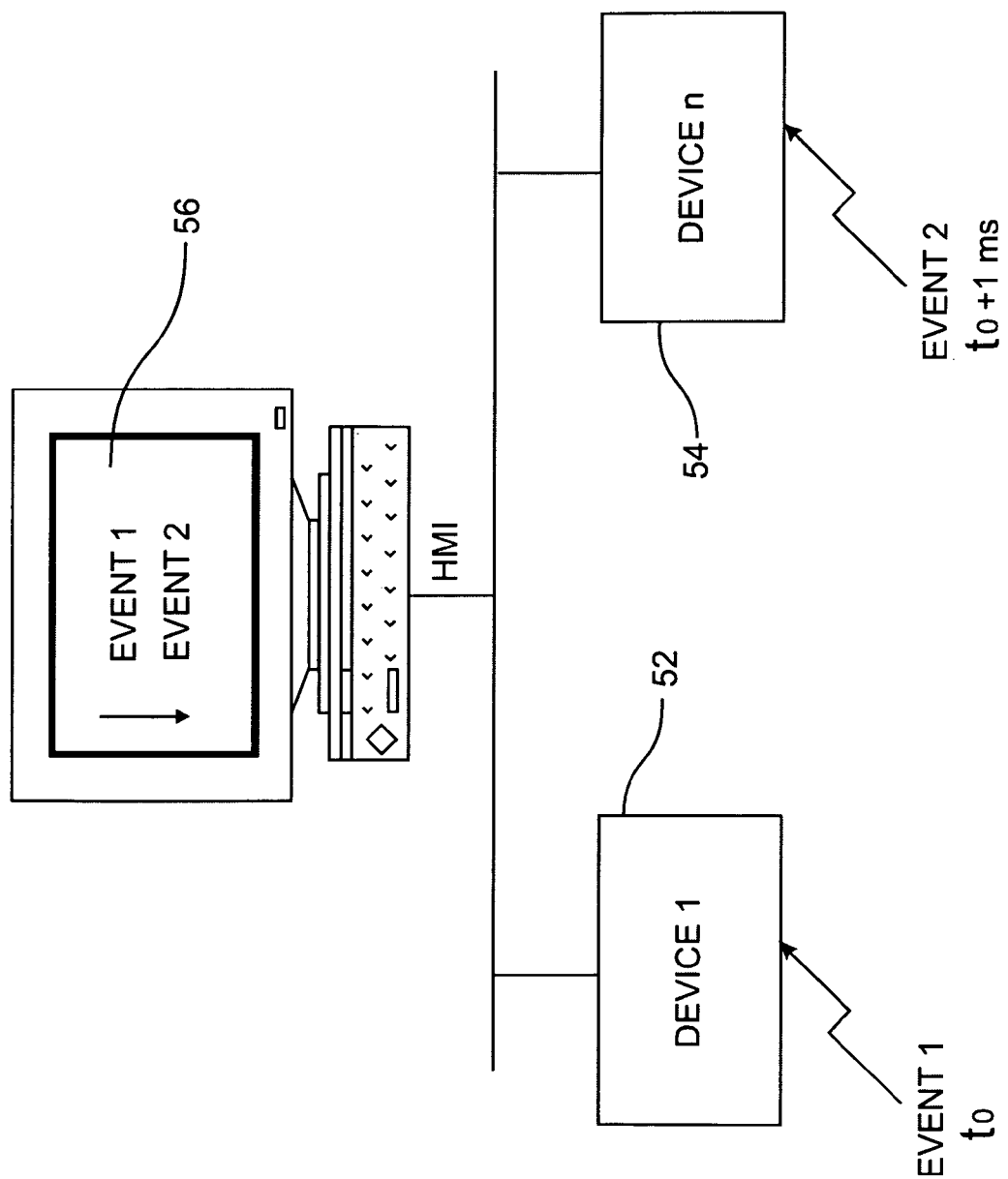
FIG. 3 is a simplified block diagram of network device event traffic.

Referring to FIG. 3, a diagram of accurate clock synchronization also providing capability for fast periodic tasks. Periods T as low as 2 ms are possible for all n devices on the network. There is event 56 time stamping capability in each device 52, 54, with discrimination of events distributed in the overall system and separated by only 1 ms, shown as time +1 ms at device number n.

Figure 4:
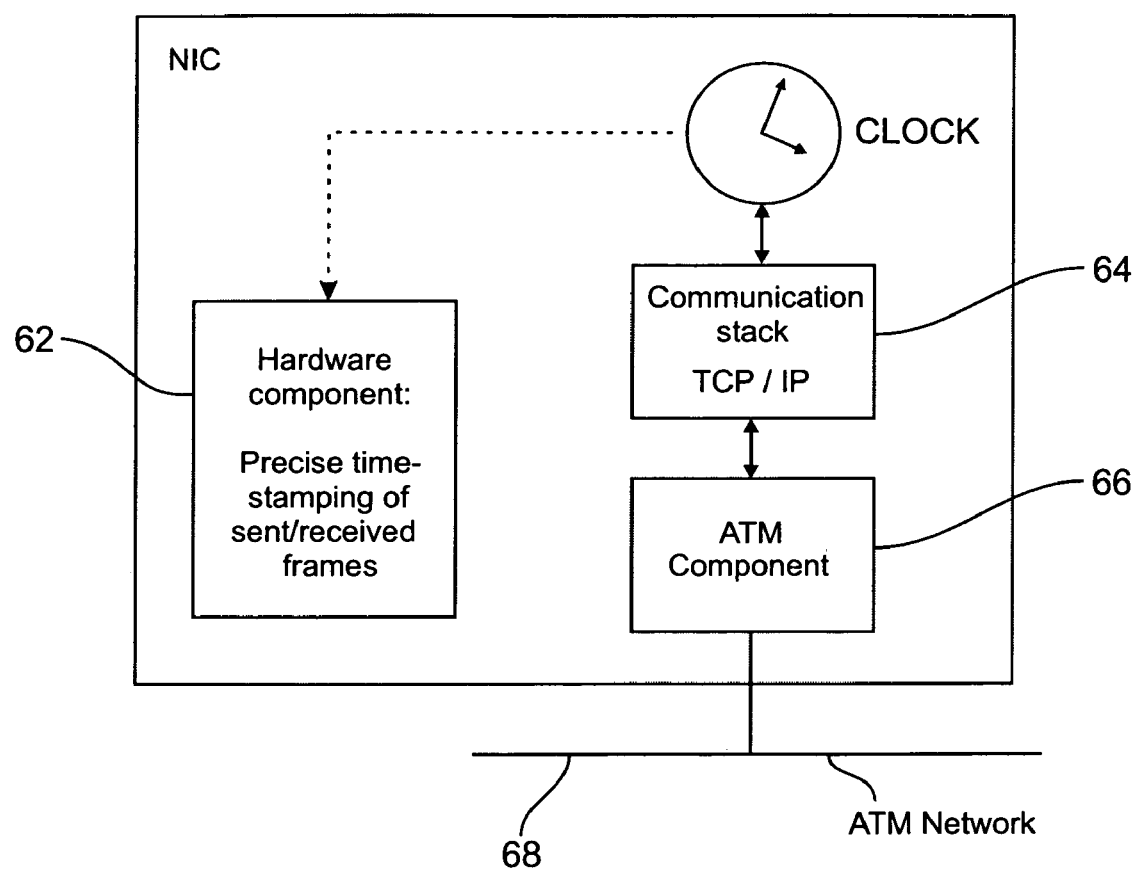
FIG. 4 is a block diagram of asynchronous transfer mode network time stamping.

Referring to FIG. 4, a diagram of clock synchronization and quality of service with an asynchronous transfer mode (ATM) network environment. The hardware components 62 provide precise time stamping of sent and received frames. With the network of FIG. 4, there is preferably an 80 microsecond accuracy achieved with the quality of service native to the ATM network 68.

Figure 5:
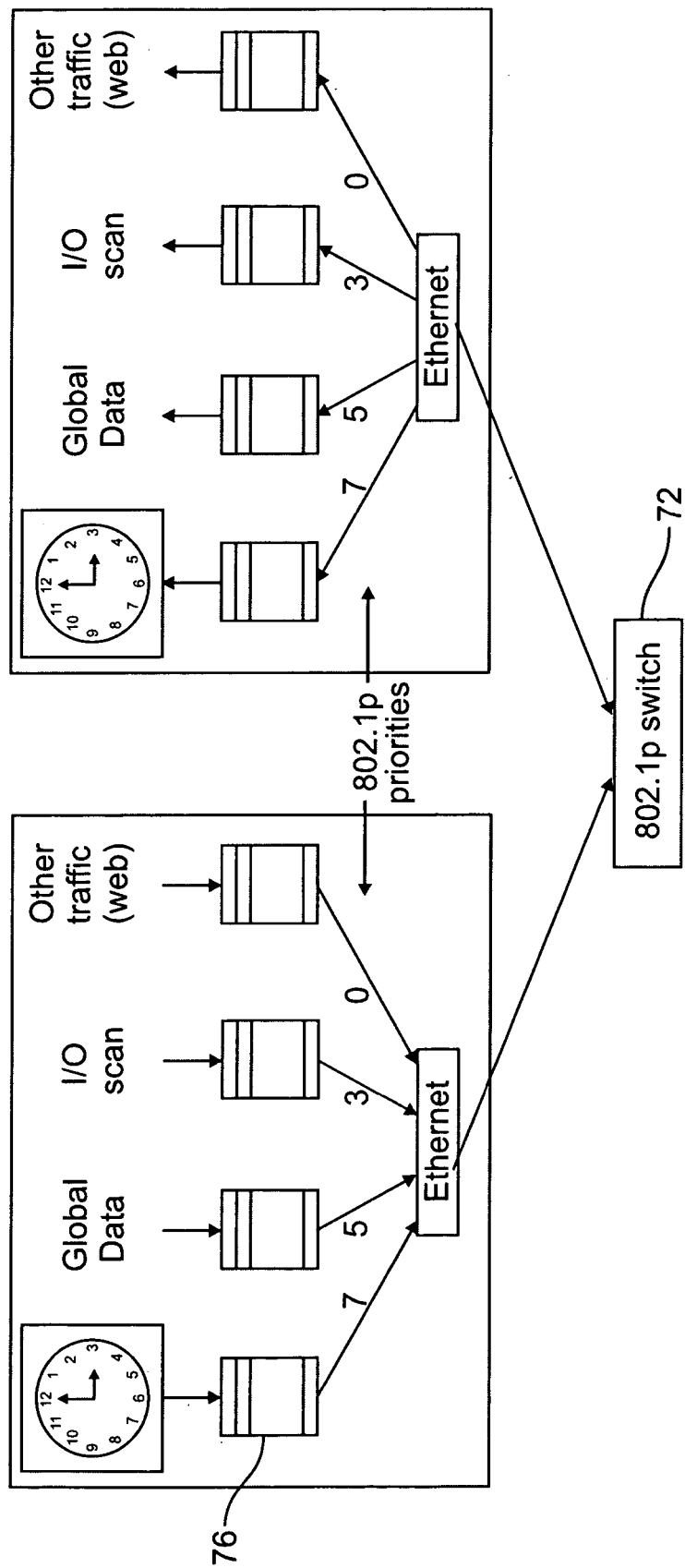
FIG. 5 is a simplified block diagram of prioritized network traffic classes using dedicated parallel communication stacks.
Figure 6:
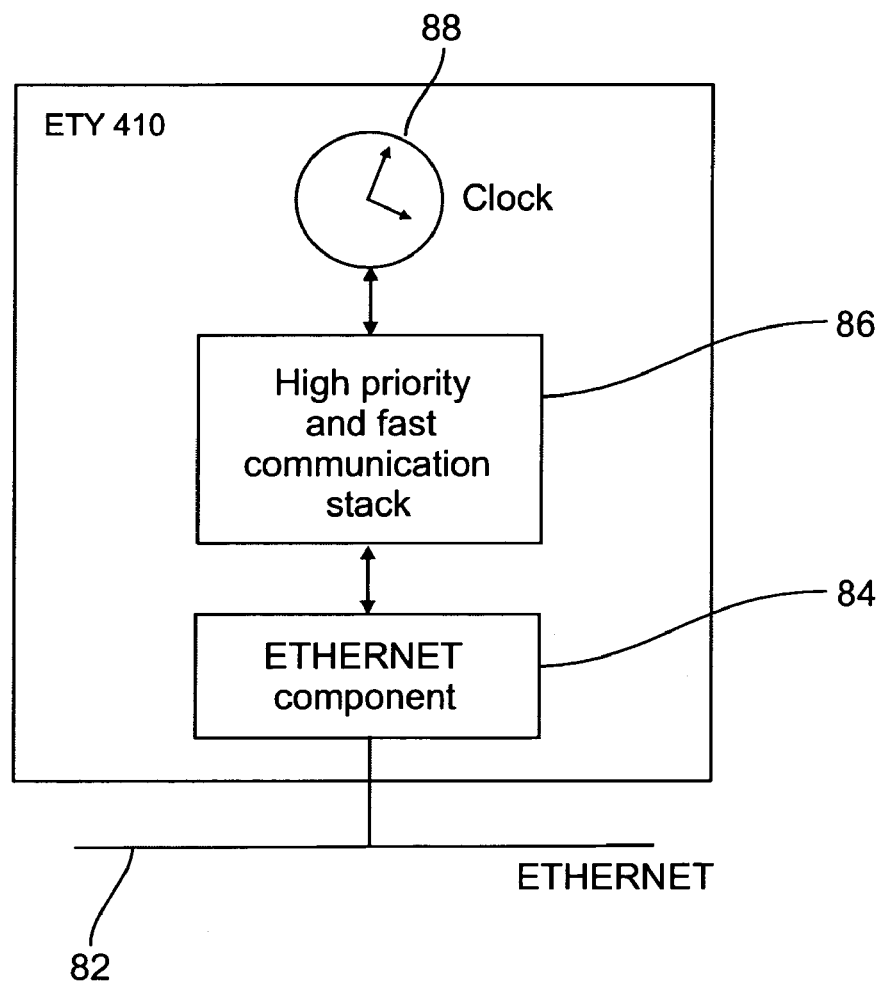
FIG. 6 is a simplified block diagram of Ethernet reduced stack clock synchronization.

FIGS. 5 and 6 refer to the present invention, using Ethernet with IEEE802.1p prioritization. Clock synchronization frames are preferably tagged with the highest priority and are put on the network through a reduced stack UDP/IP. The use of a reduced stack and frames tagged with priority aids efficient device clock synchronization. Lower priority traffic must wait for higher priority frames to be transmitted. FIG. 5 is a diagram an embodiment of synchronization and quality of service with Ethernet. The Ethernet standard 802.1p is used to prioritize frames and traffic is sent through the 802.1p switch 72. The priorities are managed from application to application inside devices. In this embodiment, the highest priority level is given to clock synchronization frames 76.

FIG. 6 refers a diagram of an embodiment of clock synchronization with Ethernet 82. Device clock 88 synchronization frames get prioritized and pass through a reduced stack. Other Ethernet traffic passes through standard protocol channels, onto the network. The embodiment is developed with a standard hardware device with no additional hardware component. Software modifications are made to manage clock synchronization by implementation of IEEE802.1p priorities on the network and in the device.

Figure 7:
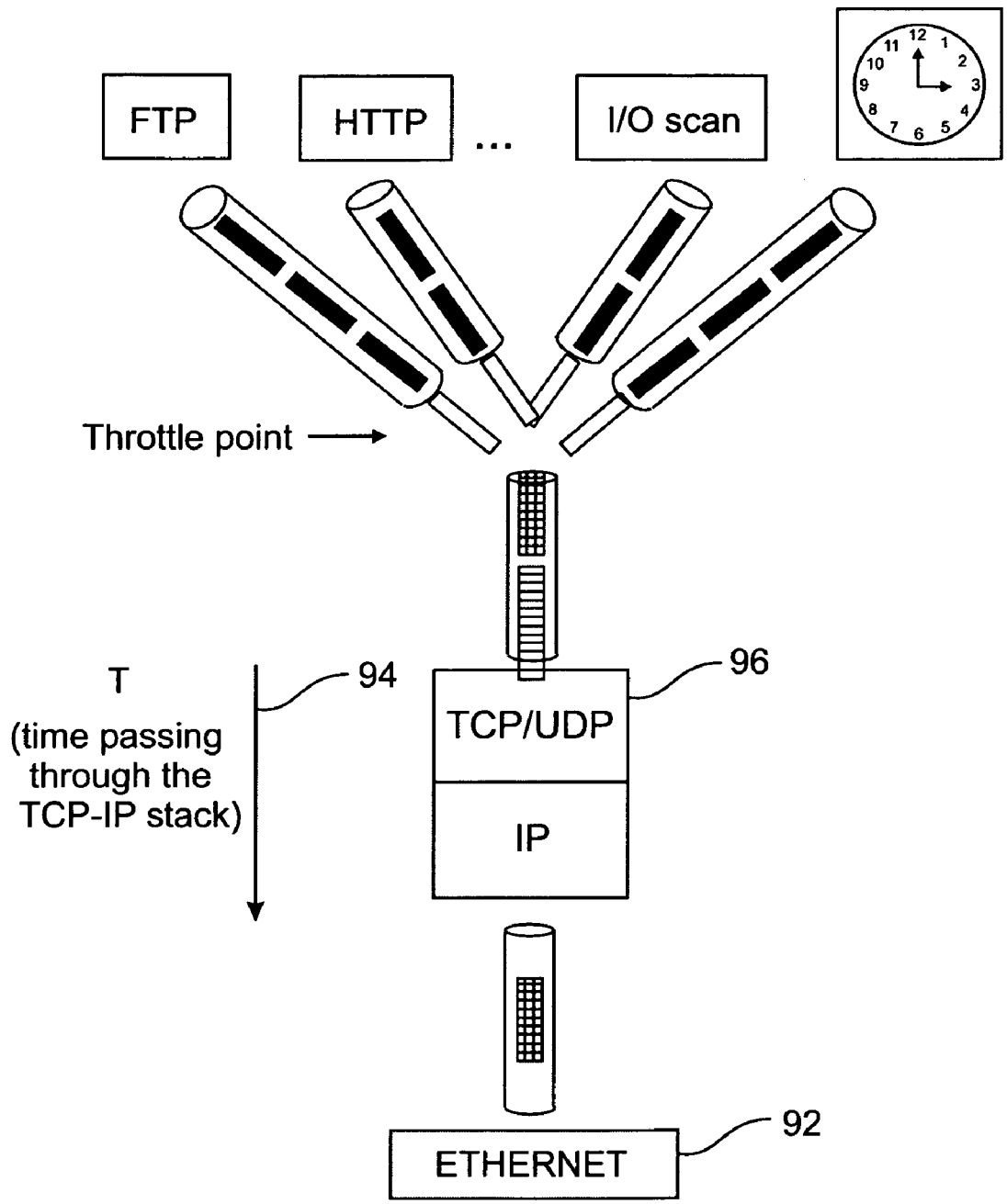
FIG. 7 is a simplified block diagram of classic Ethernet traffic throughput.

FIG. 7 is a diagram of the classic embodiment of clock synchronization with Ethernet 92. This embodiment does not employ IEEE802.1p nor use a reduced stack. Frames are sent in random order with synchronization frames possibly waiting T times the number of frames 94. The time 94 needed for traffic to pass through the TCP/IP 96 can be contrasted with the Ethernet architecture represented in FIG. 8

Figure 8:
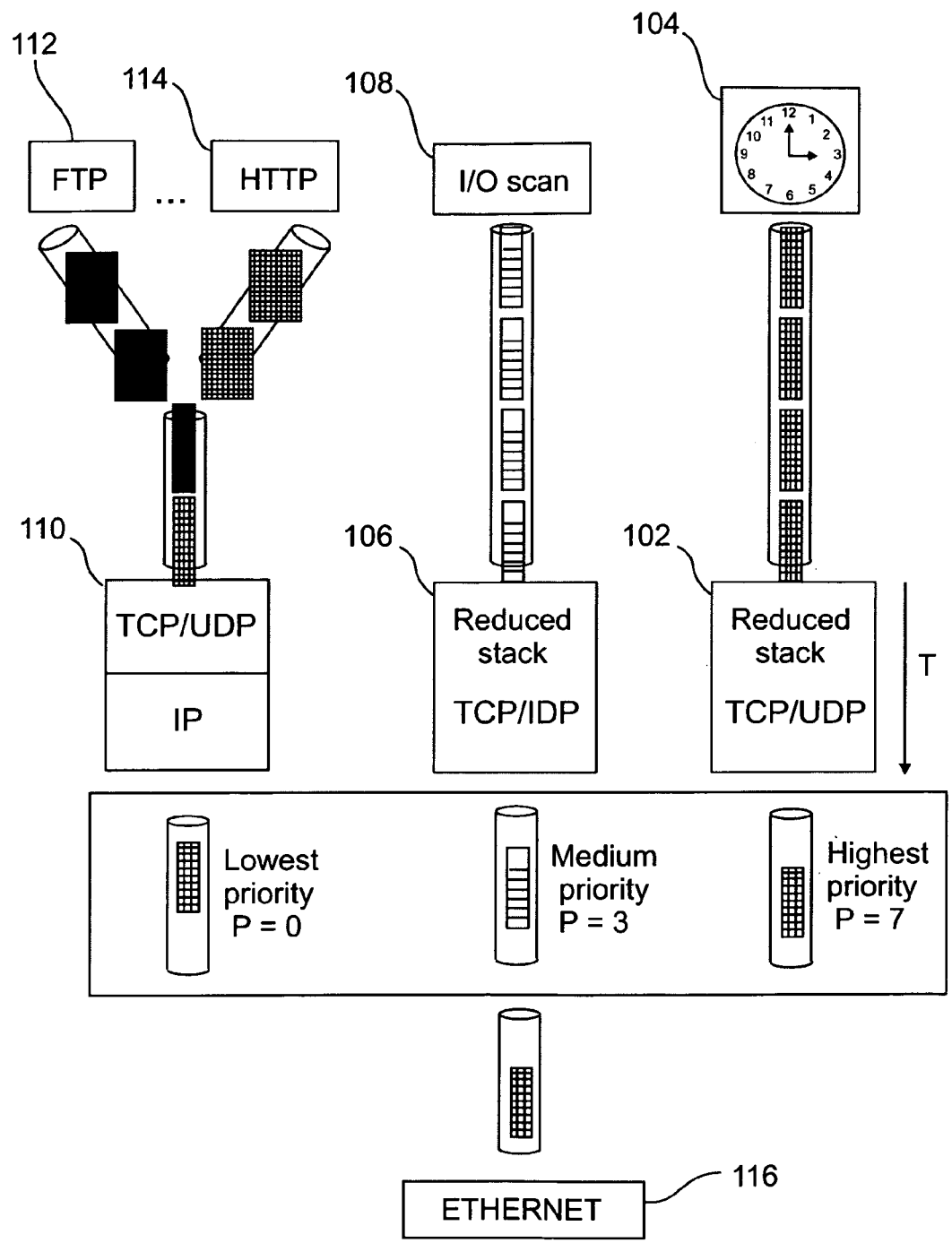
FIG. 8 is a simplified block diagram of Ethernet architecture with multiple stacks and prioritized frames.

Referring to FIG. 8, in an embodiment of the present invention wherein a reduced stack (UDP/IP) 102 is allocated to the highest priority frames, clock synchronization 104. A second reduced stack (TCP/IP) 106 addresses slightly lower prioritized frames, such as I/O scan frames 108. The last stack (TCP/UDP/IP) 110 handles the lowest priority traffic, such as FTP 112 and HTTP 114 frames. This embodiment does employ IEEE802.1p and reduced stack Ethernet 116 architecture. Frames are sent in the priority order and clock synchronization frames are only delayed by t (time passing through the reduced UDP-IP stack 102).

Figure 9:
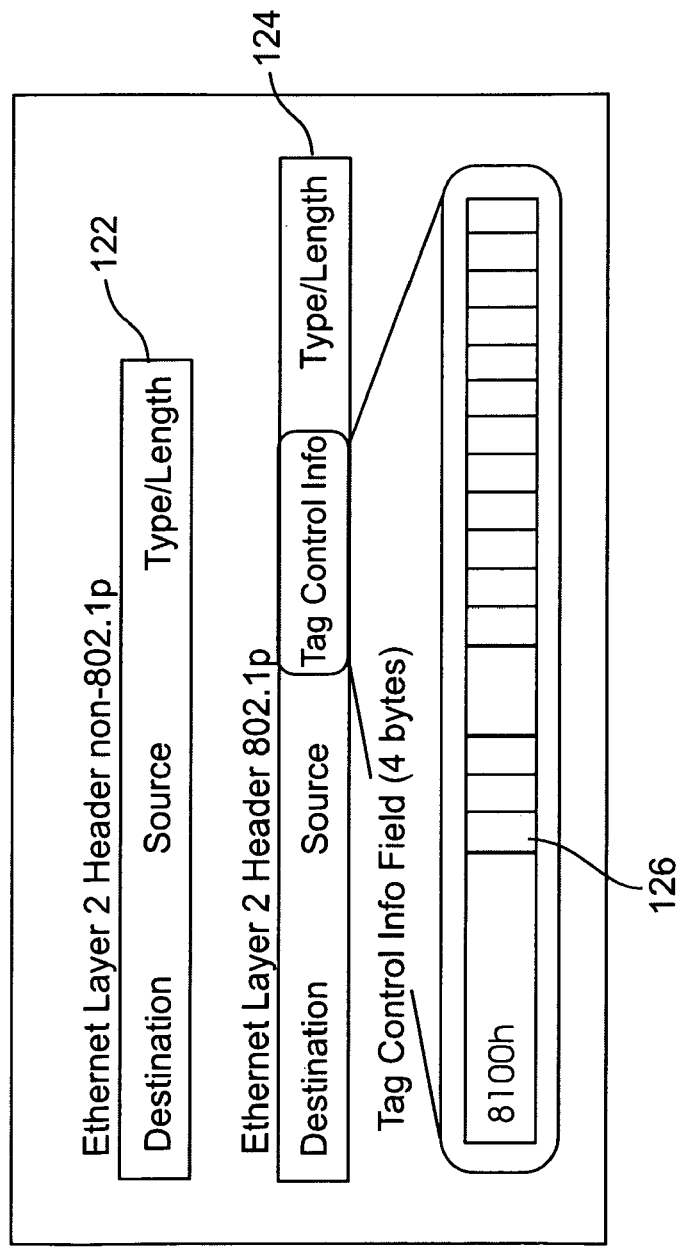
FIG. 9 is a diagram of the Ethernet header fields.

Referring to FIG. 9, Ethernet message headers are shown to represent an untagged header 122 without IEEE802.1p and a tagged header 124 with IEEE802.1p tag control information including the 3-bit priority field 126. FIG. 9 diagrams the IEEE802.1p protocol. Four additional bytes are inserted in the Ethernet layer 2 MAC frames as tag control information with a 3-bit field for priority.

Figure 10:
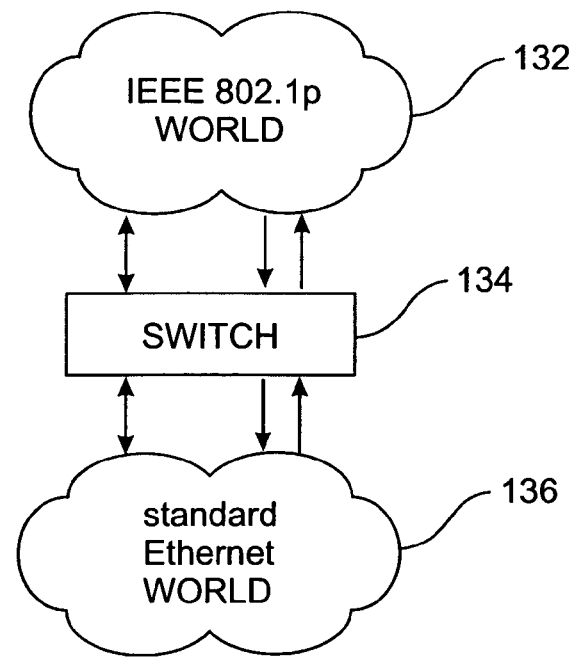
FIG. 10 is a simplified diagram of the interrelationship of tagged and untagged device traffic.
Figure 11:
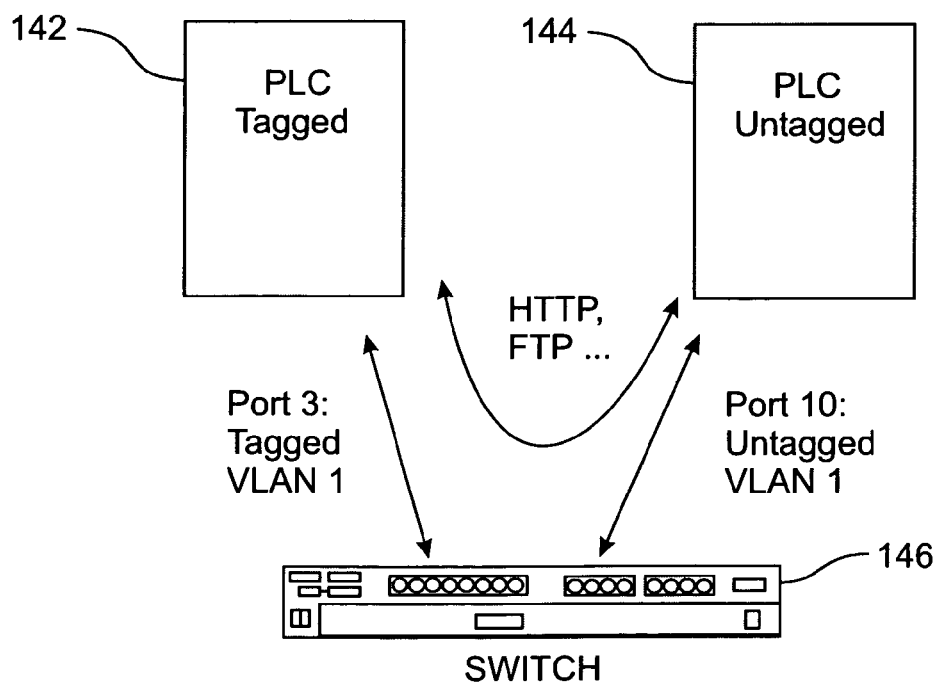
FIG. 11 is a simplified block diagram of tagged and untagged device traffic.
Figure 12:
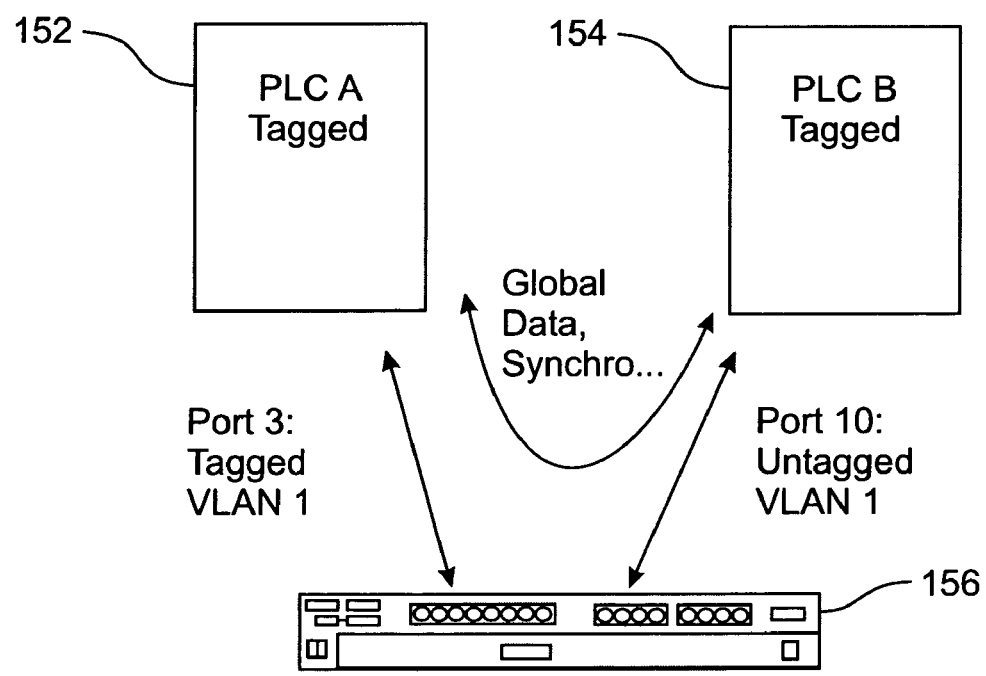
FIG. 12 is a simplified block diagram of tagged device to tagged device traffic.

FIGS. 10, 11, and 12 display the interaction compatibility of untagged and tagged devices and frames. FIG. 10 is a diagram depicting the compatibility between standard Ethernet 136 and IEEE802.1p 132 frames. The switch 134 ensures the compatibility between a tagged and an untagged device. The switch 134 adds the VLAN information to untagged frames by assigning them a priority of zero, the lowest priority. The switch 134 also removes the VLAN information from frames addressed to untagged devices.

FIG. 11 is a diagram depicting the interrelationship between a tagged 142 and an untagged 144 device. In this embodiment, frames tagged by a programmable logic controller 142 arrive on port 3 and are automatically untagged by the switch 146 and sent to port 10. On the return path, frames arrive at port 10 and are tagged with a VLAN of one and a priority of zero. Frames are then switched to port 3 where they are transmitted out of the switch tagged.

FIG. 12 is a diagram depicting an interrelationship between two tagged devices 152 and 154. In this embodiment, frames tagged by programmable logic controllers 152 arrive on port 3 and 10, the switch 156 detects them as tagged, and forwards them as configured. Frames are tagged with a priority level. Frames are switched corresponding to this priority.

Figure 13:
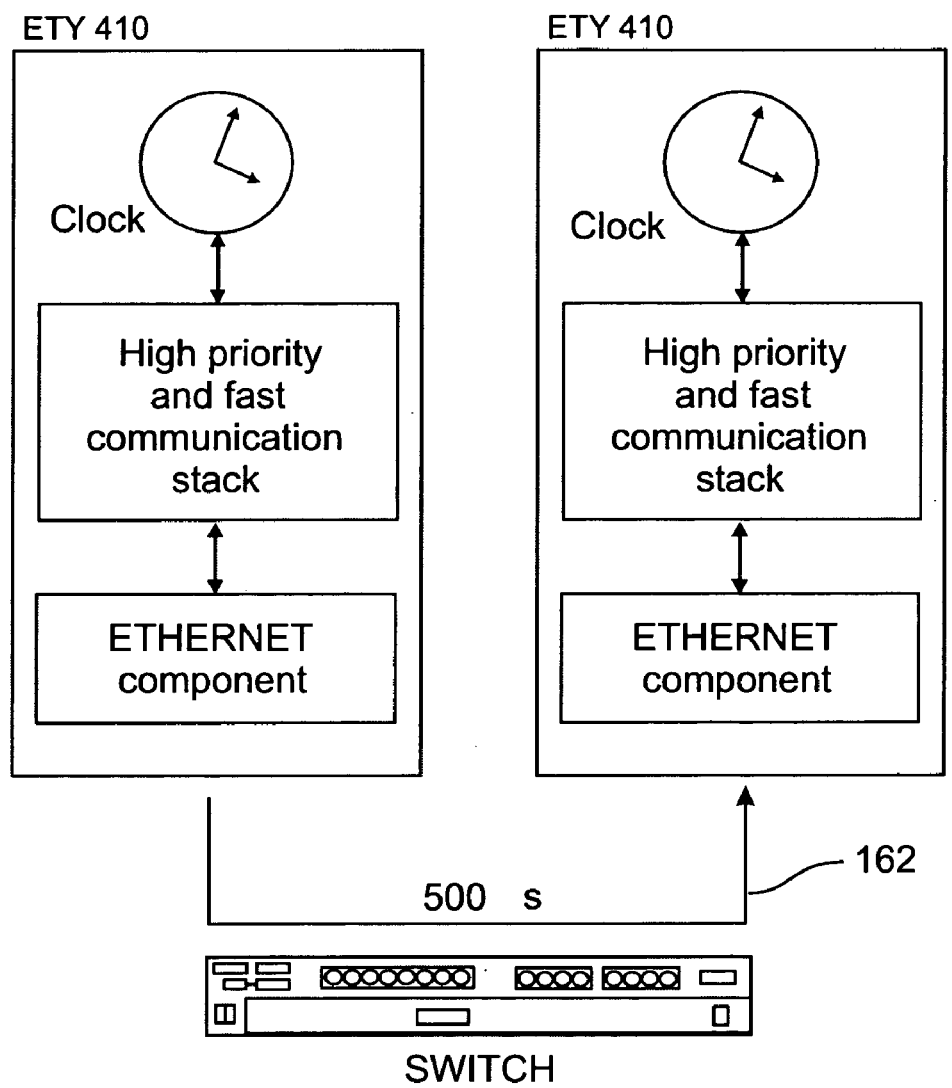
FIG. 13 is a simplified block diagram of Ethernet high priority, reduced stack, clock synchronization; and, FIG. 14 is a simplified block diagram of a sample network.

Referring to FIG. 13, a diagram depicting the results of a complete transaction response time from application to application, request and response. In classical stack architecture, there is no guaranteed time synchronization. A classical Ethernet stack can be congested and deterministic exchanges become impossible. With a reduced stack and IEEE802.1p as shown, time synchronization is guaranteed. Fast synchronization of all device clocks is achieved with accuracy 162 less than 500 μs, in the worst case.

Figure 14:
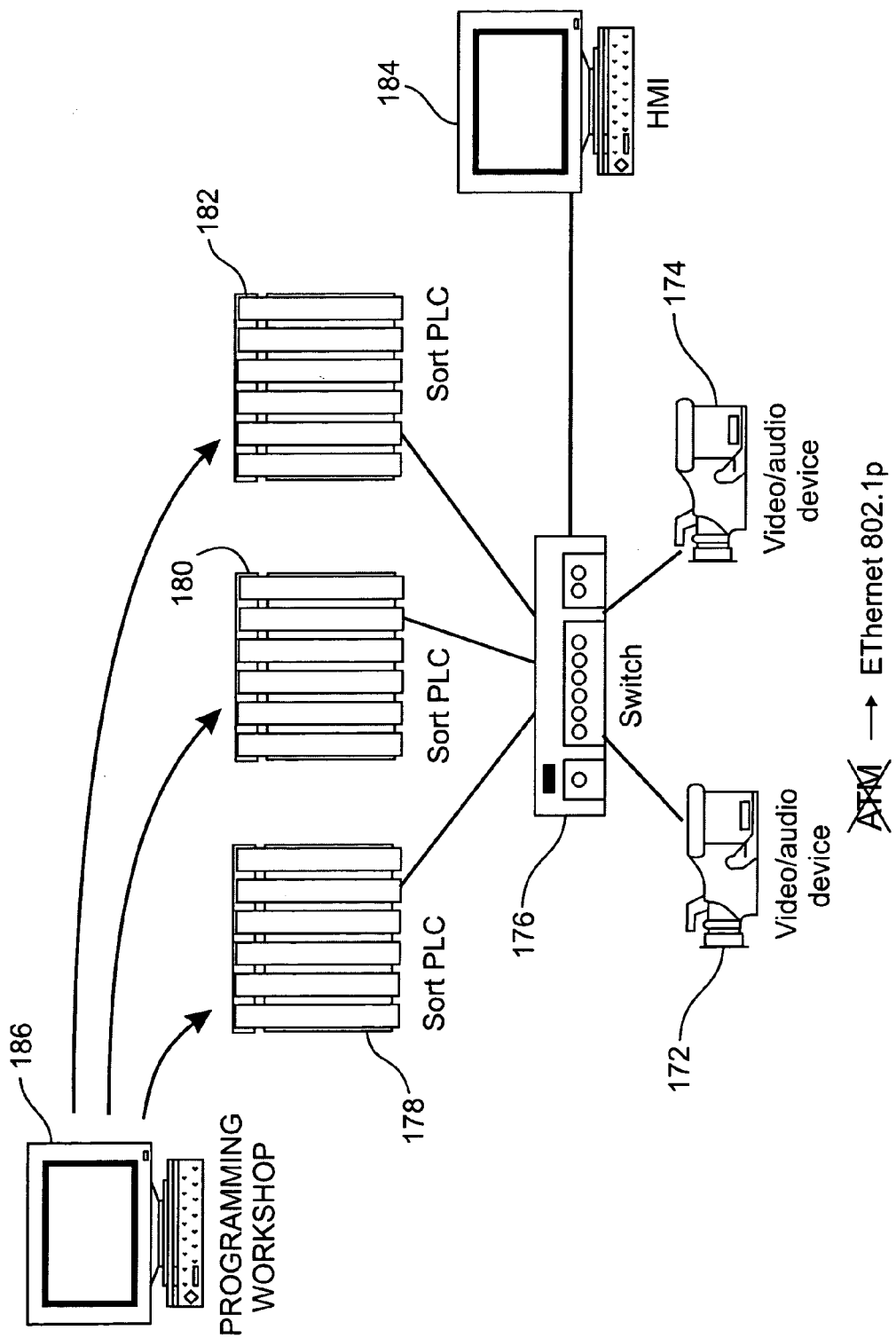

Turning to FIG. 14, shows a diagram depicting an embodiment of IEEE802.1p implementation over a complete architecture. Network devices can include, but are not limited to, PLCs 178, 180, and 182, an IEEE802.1 p switch 176, some type of human/machine interface 184, and audio and video 172 and 174 devices.

Potential applications using the preferred embodiment of the present invention include motion control, drives and robots application requiring fast synchronization, electrical distribution applications requiring discrimination of events, automation applications with Ethernet bandwidth management issues, applications requiring voice, data, and image coexisting on the same Ethernet network, and the like.

While the specific embodiments have been illustrated and described, numerous modifications come to mind without significantly departing from the spirit of the invention, and the scope of protection is only limited by the scope of the accompanying Claims.

We claim:

1. An Ethernet industrial control system for transferring a plurality of messages, wherein the messages are tagged with identifiers of varying levels of priority, ranging from a highest priority to a lowest priority, the system comprising:
   a serial network bus;
   means for placing the message onto the bus, wherein a message having a higher priority identifier is placed onto the bus before placing a message with a lesser priority identifier onto the serial network bus;
   a slave device communicatively coupled to the bus; and,
   a clock synchronization message for the slave device is tagged with the highest priority identifier.

2. The system of claim 1, wherein the levels of priority adhere to IEEE802 standards.

3. The system of claim 1, wherein the message placing means is a fast communication, reduced UDP-IP stack.

4. The system of claim 3, wherein the fast communication, reduced UDP-IP stack is dedicated for time critical flow.

5. The system of claim 4, including a plurality of communication stacks, wherein the fast communication, reduced UDP-IP stack operates in parallel with the other communication stacks.

6. The system of claim 5, wherein the communication stacks are dedicated to specific classes of messages.

7. The system of claim 1, wherein a master device is communicatively coupled to the bus and the master device places the clock synchronization message on the bus.

8. The system of claim 4, wherein the fast communication, reduced UDP-IP stack is dedicated to a clock synchronization message class.

9. For an Ethernet industrial control system having a master device having master clock, an I/O module having a local device clock and a bus communicatively coupling the master device and the I/O module, wherein messages having varying levels of priority are placed on the bus by the master device, including a clock synchronization message for synchronizing the local device clock with the master clock, a method for quickly synchronizing the local device clock with the master clock, the method comprising:
   generating a clock synchronization message, synchronized to the master clock;
   tagging the clock synchronization message with a high priority identifier;
   tagging other messages with a lesser priority identifier; and
   placing the message having the high priority identifier onto the bus before placing the message with the lesser priority identifier onto the bus.

10. The method of claim 9, further using a first fast communication, reduced UDP-IP stack to place the message having the high priority identifier onto the bus before placing the messages with the lesser priority identifier onto the bus.

11. The method of claim 10, further dedicating the first fast communication, reduced UDP-IP stack for time critical flow.

12. The method of claim 11, further employing a second fast communication, reduced UDP-IP stack dedicated to I/O scan messages.

13. The method of claim 10, further employing a plurality of communication stacks for network message traffic of a plurality of priority levels.

14. The method of claim 10, further using a switch to retain network compatibility between tagged and untagged network devices.

15. The method of claim 10, further tagging network traffic with an IEEE 802 tag control information field inserted in a network frame header.

16. The method of claim 15, further using priority level tags ranging from 7 (highest priority) to 0 (lowest priority).

17. The method of claim 14, further adding VLAN information to untagged frames by assigning them a priority of 0 (the lowest priority) and removing VLAN information to frames addressed to untagged devices.

18. The method of claim 10, further using motion controls, drives and robots applications as the I/O modules requiring fast synchronization.

19. The method of claim 10, further coexisting applications requiring voice, message, or image transmissions on the same network.

20. An Ethernet industrial control system for transferring messages, wherein a message is tagged with identifiers of varying levels of priority, the system comprising:
   a master device having means for generating a clock synchronization message;
   an I/O module having a slave clock responsive to the clock synchronization message for synchronizing the slave clock with the master clock; and
   a bus communicatively coupling the master device and the I/O module, wherein the master device includes means for tagging the clock synchronization message with a high priority identifier, means for tagging other messages with a lesser priority identifier, and means for placing the message having the high priority identifier onto the bus before placing a message with a lesser priority identifier onto the bus.

21. The system of claim 20, wherein a fast communication, reduced UDP-IP stack is dedicated for time-critical flow.

22. The system of claim 20, wherein there is network compatibility between tagged and untagged network devices.

23. The system of claim 20, wherein a tag control information field is inserted into network traffic in a network frame header to indicate traffic priority.

24. The system of claim 23, wherein the priority level tags range from 7 (highest priority) to 0 (lowest priority).

25. The system of claim 20, wherein a switch adds VLAN information to untagged messages by assigning them a priority of 0 (the lowest priority) and removes VLAN information to messages addressed to untagged devices.

26. The system of claim 20, wherein the message transfer has synchronous scheduling of network exchanges and code execution for consistent message on all network devices.

27. The system of claim 20, wherein an industrial control system has motion controls, drives and robots applications requiring fast synchronization.

28. The system in claim 27, wherein the industrial control system has electrical distribution applications requiring discrimination of events.

29. The system in claim 27, wherein the industrial control system transfers message automation applications with Ethernet management issues.

* * * * *